3,484,213
POLYMER HANDLING AND CONVEYING APPARATUS
William F. Dew, Jr., Byrd T. Thompson, Jr., and Allen E. Leybourne, Decatur, Ala., assignors to Monsanto Company, St. Louis, Mo., a corporation of Delaware
Filed Dec. 21, 1966, Ser. No. 603,673
Int. Cl. B29b 5/00; C08f 47/00
U.S. Cl. 23—285                                  8 Claims

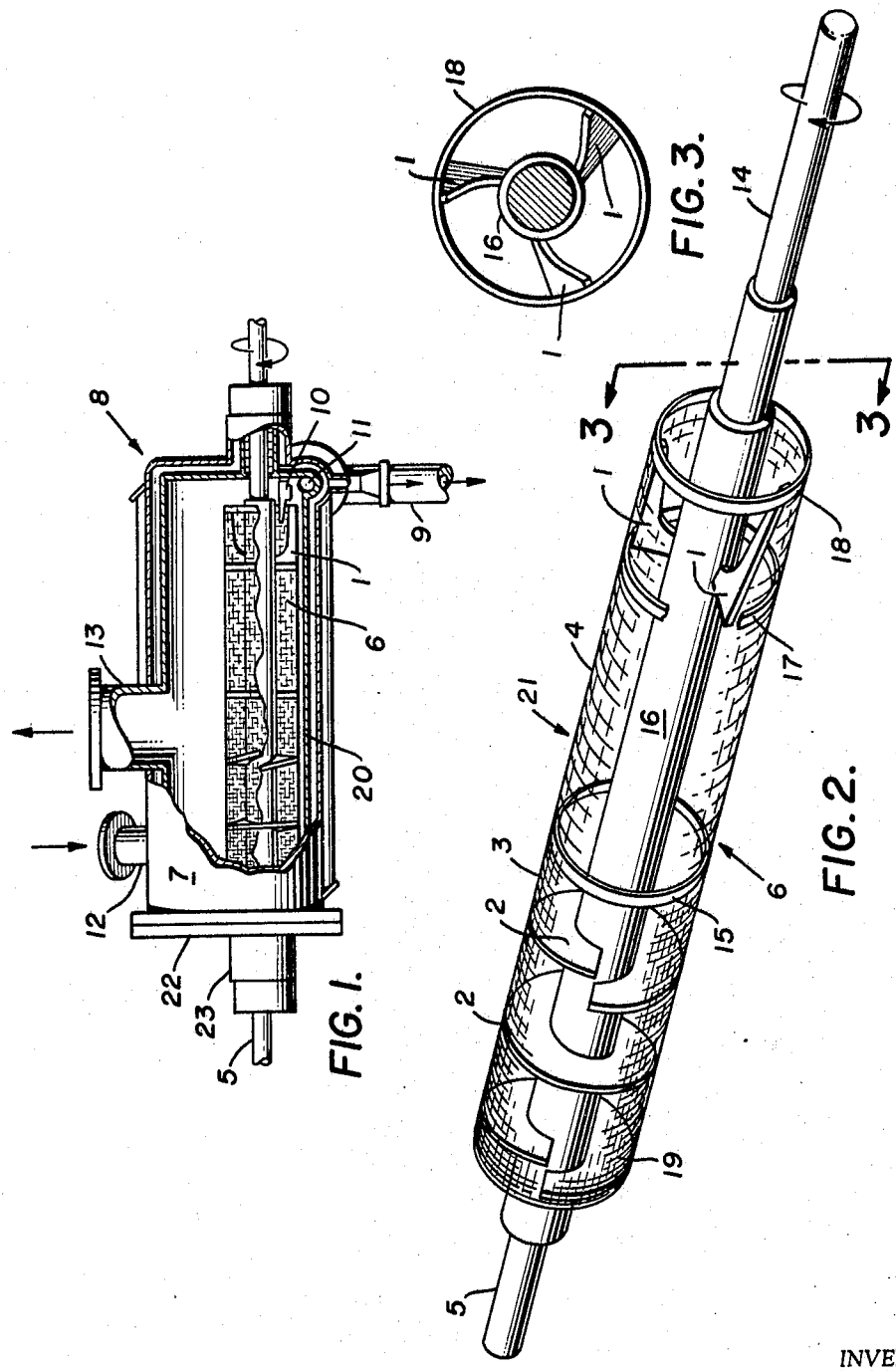

ABSTRACT OF THE DISCLOSURE

A polymer handling and conveying apparatus for incorporation into a finisher comprising a radially perforated right circular cylinder having input and output ends, and being supported by and coaxially aligned with a central shaft, and helical blades positioned within the cylinder for advancing polymer axially along the cylinder as the apparatus is rotated.

---

This invention relates to a continuous polymerization apparatus which is specifically constructed to provide uniform retention time, controlled mixing, and excellent film formation. More specifically, this invention deals with a cage finisher having helical cantilevered blades positioned therein.

One of the principle steps encountered in the production of polymeric materials by melt polymerization is the finishing step during which the polymerization reaction is carried to its completion. In continuous processes such as those used in the production of nylon and polyesters, this final polymerization step is normally carried out in heated cylindrical horizontal vessels known as finishers. It is desirable that these finishers provide substantial compartmentalized flow (flow with a minimum of mixing in the axial direction) of the polymer being treated since polymers are subject to degradation if maintained at elevated temperatures for extended periods of time. Considerable mixing of the polymer within each compartment is desirable in order to provide a uniform output product and to facilitate contact between relative molecules so that the desired reaction may go forward. It is thus necessary to retain the polymer in the finisher for a sufficient time to complete the reaction, but equally necessary to prevent any particular group of molecules from being retained much longer or shorter than the average retention time for all molecules.

The removal of gaseous or vaporous reaction products from high viscosity melts is usually difficult to achieve in a reasonable length of time. Such removal is greatly facilitated by forming a polymer into a film to increase its surface area.

Prior art finishers have used both solid and perforated continuous screws for forwarding the polymer. The solid screw can generally be designed to provide substantially compartmentalized flow, but most practical designs require operation at slow speed, such as from 1 to 3 revolutions per minute. These slow speeds produce poor mixing within the compartments and low film-forming efficiencies. Only limited improvement can be realized with perforated screw flights, because if the perforations are sufficiently large to produce the pumping efficiency and allow higher screw speeds with consequent improvement in mixing within each compartment, backward and forward mixing through the perforations between adjacent compartments becomes objectionable.

An alternative approach involves the use of discontinuous screws containing solid and/or perforated discs, screw flight segments, and the like. This permits the use of much higher screw speeds but the characteristic flow patterns created by this arrangement generate objectionable back and forward mixing. Thus this approach likewise causes the residence time of many molecules to deviate substantially from the average, and satisfactory compartmentalized flow is not realized.

Even, as in the prior art, when the central shaft associated with a cage finisher is eliminated, shorter and smaller cages are found expedient and even though they eliminate many of the problems of irregular flow and substantial deviations from the desired uniform residence time, they prove inadequate to accomplish the intended result. The reason for the shorter cages is due mainly to economics and simplicity. The longer such a cage, the bulker and more complicated it becomes.

Accordingly, these and other difficulties are overcome by constructing a polymer forwarding apparatus in the form of a radially perforated horizontal rotatable cylinder having positioned therein helical cantilevered blades through which the polymer flows axially, as will be more fully brought out later.

It is therefore an object of this invention to provide a polymerization apparatus which has excellent film formation properties, thus providing for efficient removal of the gaseous reaction products.

Another object of this invention is to provide a polymerization apparatus which produces excellent mixing of molecules having the same residence times.

Further, it is an object of this invention to provide a polymerization apparatus which insures substantially uniform retention time of the molecules within the apparatus.

These and other objects and advantages will become more readily apparent when read in conjunction with the following detailed description and drawing which shows the apparatus of this invention.

FIGURE 1 is a side elevation view partially broken away, of an exemplary polymerization apparatus, or finisher, according to the present invention.

FIGURE 2 is a schematic perspective view, partially broken away, of the polymer conveying and handling apparatus.

FIGURE 3 is a sectional view taken along line 3—3 of FIGURE 2 showing an end view of the helical cantilevered blades of this invention.

Referring now to FIGURE 1, finisher 8 comprises a generally cylindrical finishing or reaction chamber 20 surrounded by heating jacket 7, and includes a novel polymer handling and conveying assembly 6 according to the present invention disposed within chamber 20. Partially polymerized material of low molecular weight is fed into the left end of chamber 20 as viewed in FIGURE 1 through an input supply line 12, while the finished high molecular weight polymer is removed through an output line 9 at the right end of chamber 20 as viewed in FIGURE 1. The high molecular weight polymer is removed from chamber 20 by an auger 11 or other suitable means and passes through output line 9. An exhaust line 13 communicates with the upper portion of chamber 20 in order to remove the gaseous reaction products.

The novel polymer handling and conveying assembly 6 is best illustrated in FIGURE 2, to which reference is now made. A pair of stub shafts 5 and 14 are aligned on the axis of assembly 6, and along with shaft 16 support the remainder of the cage assembly 6. Assembly 6 is rendered cage like by peripheral mesh or grid denoted by numbers 3 and 4. It will be noted that mesh 3 is smaller than mesh 4. The reason for this is that as the partially polymerized material of low molecular weight is fed into chamber 20 through input supply line 12 and proceeds toward output line 9, the molecular weight of the polymer increases and the polymer thickens and becomes more viscous. It was found that best results were obtained if the mesh size was increased as the molecular weight increased. Meshes 3 and 4 may be comprised of any suitable grid material, and be attached to supports such as 15, 17, 18, and 19. Thus we have an annular radially perforated right circular cylindrical member generally denoted by reference numeral 21 which is coaxially aligned with central shaft 16. Shaft 16 may also have rigidly mounted on the input end of assembly 6 screw segments or flights 2.

The major feature of assembly 6 is the absence of restrictions within cylindrical member 21. The absence of restrictions within the cylindrical member 21 is possible because of the helical cantilevered blades 1 which uniformly transfer the polymer along the assembly 6. The effect of blades 1 also overcomes to a large extent the tendency of the viscous polymer to adhere to and rotate with the shaft, causing irregular flow and substantial deviations from the desired uniform residence time. The assembly 6 according to the present invention is a very suitable substitute for assemblies not having the conventional central shaft because it is less expensive, simpler, and may be made a good deal larger.

The helical cantilevered blades 1 are more clearly brought out in FIGURE 3 which shows the blades set at an angle and twisted in a helical configuration.

It will be noted that blades 1 are positioned within the assembly 6 and rigidly mounted to shaft 16 which is part of stub shafts 5 and 14. Blades 1 are also rigidly secured to supports 17 and 18. It will be appreciated that the helical angle of blades 1 may be varied between 5 and 45° depending upon the viscosity of the polymer handled. Upon varying the helical angle of the blades 1 the proper amount of forward urging or pushing of the polymer may be obtained.

Blades 1 as shown are L-shaped and can be rectangular in character with a tapered section being removed adjacent shaft 16 and the output end of assembly 6. The reason for such structure is that it is desirable to have as little obstruction as possible in the extreme output end of assembly 6, and at the same time allow for a scraper blade in the event plugging does become a problem.

Assembly 6 is installed in chamber 20, the lower surface of which should fairly closely conform to the cylindrical shape of the perforated cylinder formed by meshes 3 and 4. Stub shaft 5 extends through the intake end wall 22 of chamber 20 through a suitable seal and bearing assembly 23, while stub shaft 14 is journaled in another bearing (not shown) exterior of finisher 8 near outlet line 9. Shaft 5 is driven by a suitable motor (not shown) which may be of any desired type.

In the operation of the apparatus thus described, the relatively low molecular weight polymer fed through line 12 (FIGURE 1) is conveyed by assembly 6 slowly through chamber 20 until it is finally discharged through line 9 as a high molecular weight polymer. As the polymer passes through chamber 20, most of the polymer will be contained within the cylinder defined by meshes 3 and 4. As assembly 6 is rotated by shaft 5, polymer will bridge the apertures between adjacent strands of the mesh and will be carried up until it falls from the mesh and back into the interior of assembly 6. The polymer in so falling away from the mesh will form films resembling rectangular honeycombs and having a great surface area. This greatly facilitates removal of the reaction gaseous by-products, thus promoting the polymerization reaction.

It should be particularly noted that since the mesh moves in a circular path with its wall parallel to the direction of polymer flow, there are essentially no forces which tend to mix portions of the polymer which have been in chamber 20 for different times (i.e., there is essentially no mixing in a direction parallel to the axis of assembly 6), while there is very effective mixing of polymer in all plans perpendicular to the axis of cylinder 6 as well as formation of films having greatly increased surface area.

As an example of a finisher particularly adapted for rapid polymerization of polyester, assembly 6 was about 6 ft. 4 in. long and had approximately a 14 inch diameter, with about ½ inch clearance between its lower half and the wall of chamber 20. Mesh 3 was formed of $\frac{1}{16}$ inch thick perforated stainless steel having ½ inch square openings on ⅝ inch centers, while mesh 4 was formed of $\frac{1}{16}$ inch thick perforated stainless steel having ⅞ inch squares on 1⅛ inch centers.

The helical blades 1 were about 15 inches long and ½ inch thick having a 10° pitch and being set 120° apart. The blades were attached to supports 17 and 18 which were about 1½ x ⅛ inches being about 14 inches in diameter. Shaft 16 to which the blades were secured was about 6⅝ inches in diameter.

It may be seen from the above description and the accompanying drawings that the continuous polymerizer according to the present invention promotes rapid and efficient polymerization since it is particularly adapted for forming the polymer into films having great surface area. This feature is provided by the radially perforated annular cylinder exemplified by reference numeral 21. The positioning of helical cantilevered blades 1 within the exit end of assembly 6 permits much closer control over the average residence time of polymer within the polymerizer. Assembly 6 also provides excellent mixing of the polymer in radial directions, together with minimum mixing in the direction parallel to the axis of polymer flow.

Under certain conditions there may be a tendency of the polymer to bunch around the blades 1 in finisher 6. This may be alleviated by positioning a scraper blade 10 between the ends of blades 1 and shaft 16. Scraper blade 10 can be secured to the inside wall of chamber 20 of the finisher and extend for a distance toward the input end of the cylinder and be positioned between shaft 16 and a surface generated by the rotation of blades 1 to communicate and cooperate therewith to eliminate polymer plugging in the output end of the cylinder. It may also be said that blades 1, being L-shaped, communicate and cooperate with scraper blade 10.

When a scraper blade was used, it was constructed from metal being ½ inch thick and 12 inches long and being tapered in a direction toward the input end of the assembly and also being tapered so as to fit between the shaft and the blades.

The apparatus as disclosed is simple and efficient, and is well adapted for use in polymerizing various polymers, such as nylon and polyester.

The foregoing example illustrates the essential features of the invention as well as one of the manners in which it may be practiced. Various changes and modifications may be made in practicing the invention without departing from the spirit and scope thereof and therefore, the invention should not be limited except as defined in the appended claims.

We claim:
1. A polymer handling and conveying apparatus for incorporation into a polymer finisher comprising:
    (a) a radially perforated right circular cylinder having input and output ends, and being supported by and coaxially aligned with a central shaft; and
    (b) L-shaped helical cantilevered blades positioned within the cylinder for advancing polymer axially along the cylinder as the apparatus is rotated.
2. A polymer handling and conveying apparatus according to claim 1 wherein the right circular cylinder has perforations which increase in size from the input end to the output end.
3. A polymer handling and conveying apparatus according to claim 1 wherein a plurality of helical cantilevered blades are positioned within the output end of the cylinder.
4. A polymer handling and conveying apparatus for incorporation into a polymer finisher comprising:
    (a) a radially perforated right circular cylinder having input and output ends, and being supported by and coaxially aligned with a central shaft, and having perforations which increase in size from the input end to the output end; and (b) a plurality of L-shaped helical cantilevered blades positioned within the output end of the cylinder for advancing polymer axially long the cylinder as the apparatus is rotated.

5. A polymer handling and conveying apparatus according to claim 4 wherein the helical cantilevered blades are adapted to communicated with a scraper blade which is secured to the inside wall of the finishing chamber of the finisher and which extends for a distance toward the input end of the cylinder and which is positioned between the shaft and a surface generated by rotation of the blades.

6. A polymer handling and conveying apparatus for incorporation into a polymer finisher comprising:
(a) a radially perforated right circular cylinder having input and output ends, and being supported by and coaxially aligned with a central shaft, and having perforations which increase in size from the input end to the output end; and
(b) a plurality of L-shaped helical cantilevered blades for advancing polymer axially along the cylinder as the apparatus is rotated, positioned within the output end of the cylinder and being secured to the central shaft and the cylinder, and communicating with a scraper blade which is secured to the inside wall of the finishing chamber of the finisher and which extends for a distance toward the input end of the cylinder and which is positioned between the shaft and a surface generated by rotation of the blades.

7. A polymer handling and conveying apparatus according to claim 6 wherein said cylinder is free of restrictions other than the central shaft and the helical cantilevered blades.

8. A polymer handling and conveying apparatus according to claim 6 wherein the pitch of the helical cantilevered blades ranges from about 5° to about 45°.

References Cited

UNITED STATES PATENTS

| | | | |
|---|---|---|---|
| 3,057,702 | 10/1962 | Pierce et al. | 23—285 |
| 3,279,894 | 10/1966 | Tate et al. | 23—285 |
| 3,279,895 | 10/1966 | Howe | 23—285 |

JAMES H. TAYMAN, JR., Primary Examiner

U.S. Cl. X.R.

260—75, 95; 198—216